May 9, 1939.  J. W. THOMPSON  2,157,805
SCRAPER
Filed Aug. 7, 1937  4 Sheets-Sheet 2
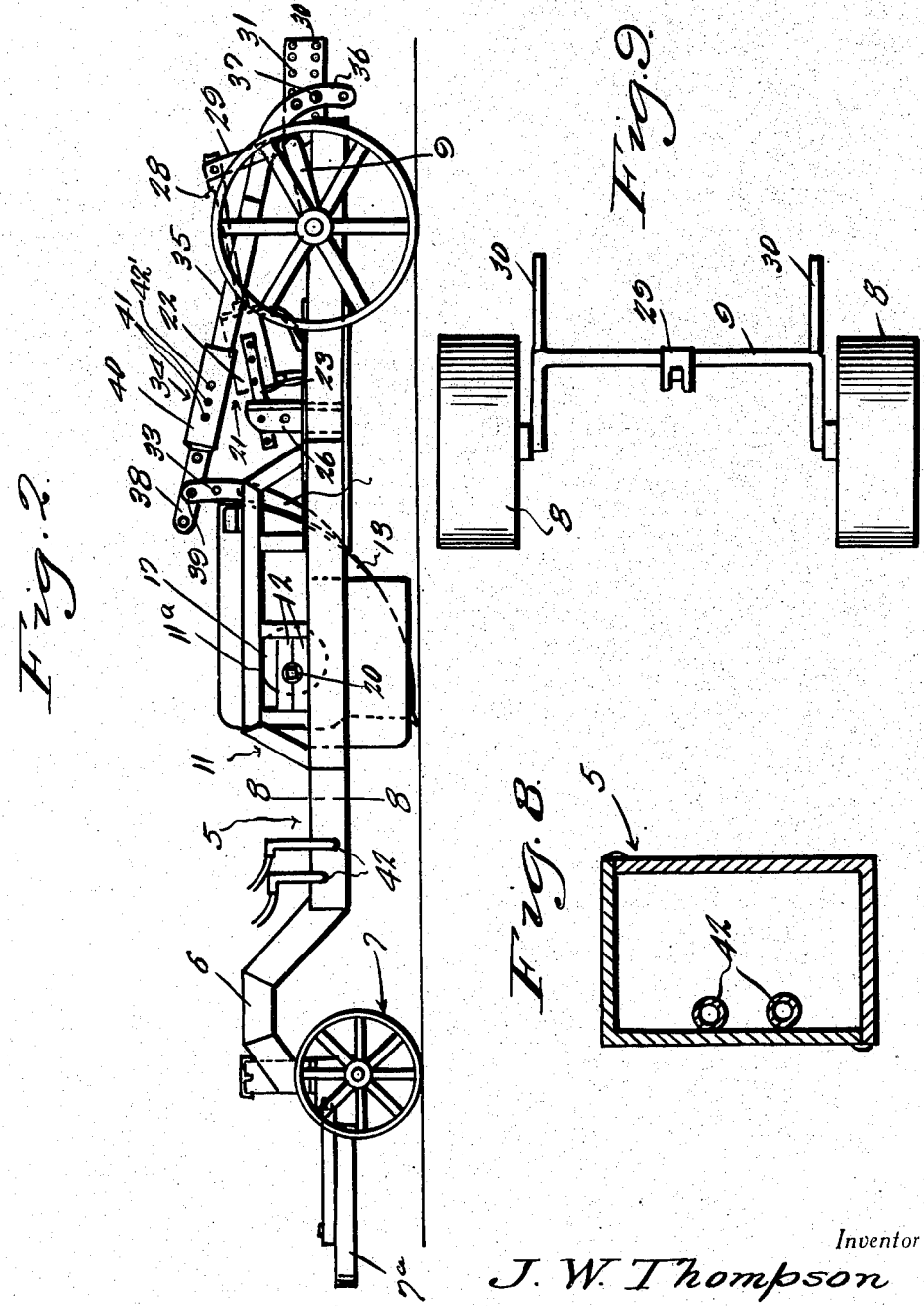
Inventor
J. W. Thompson
By Clarence A. O'Brien
Hyman Berman
Attorneys

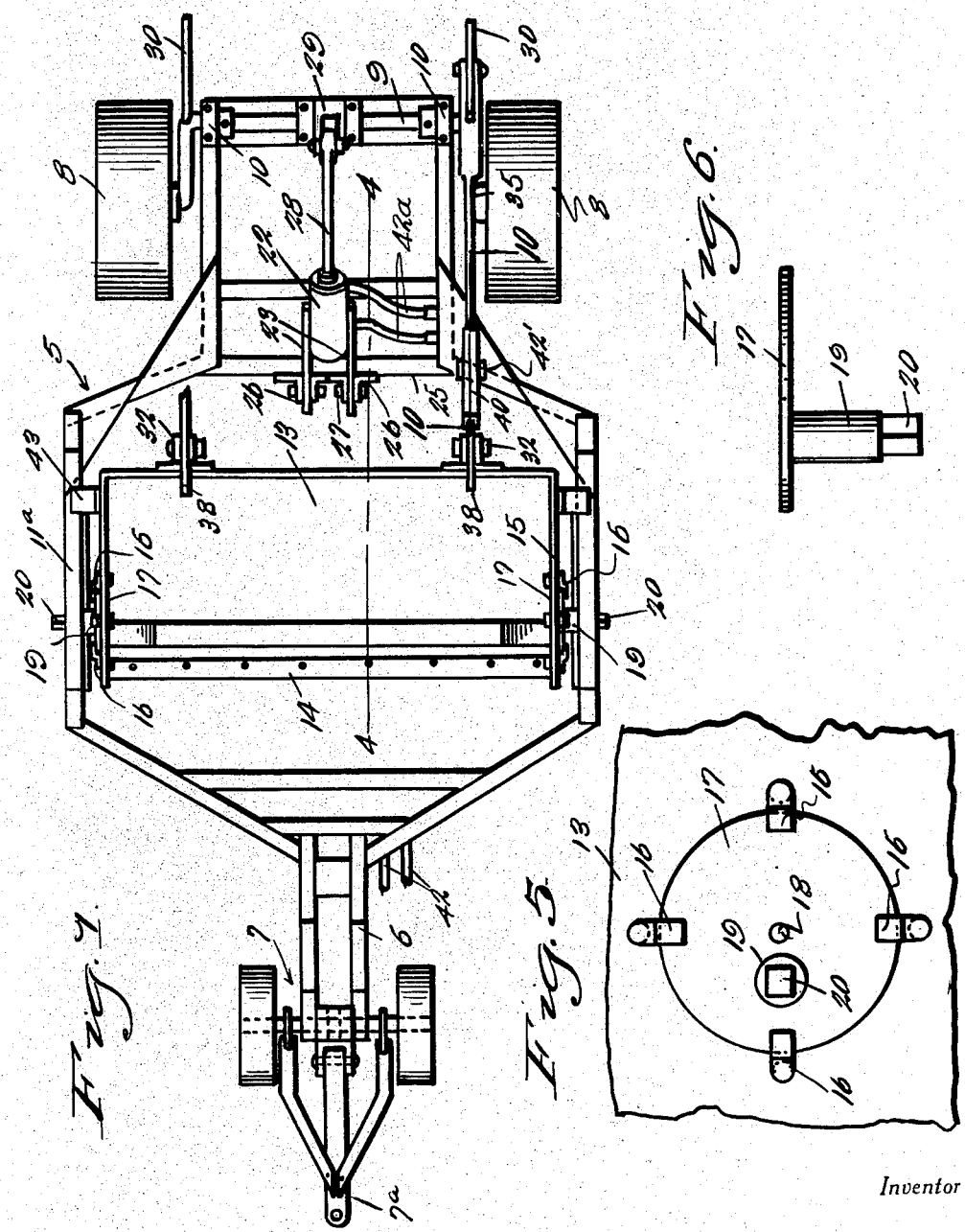

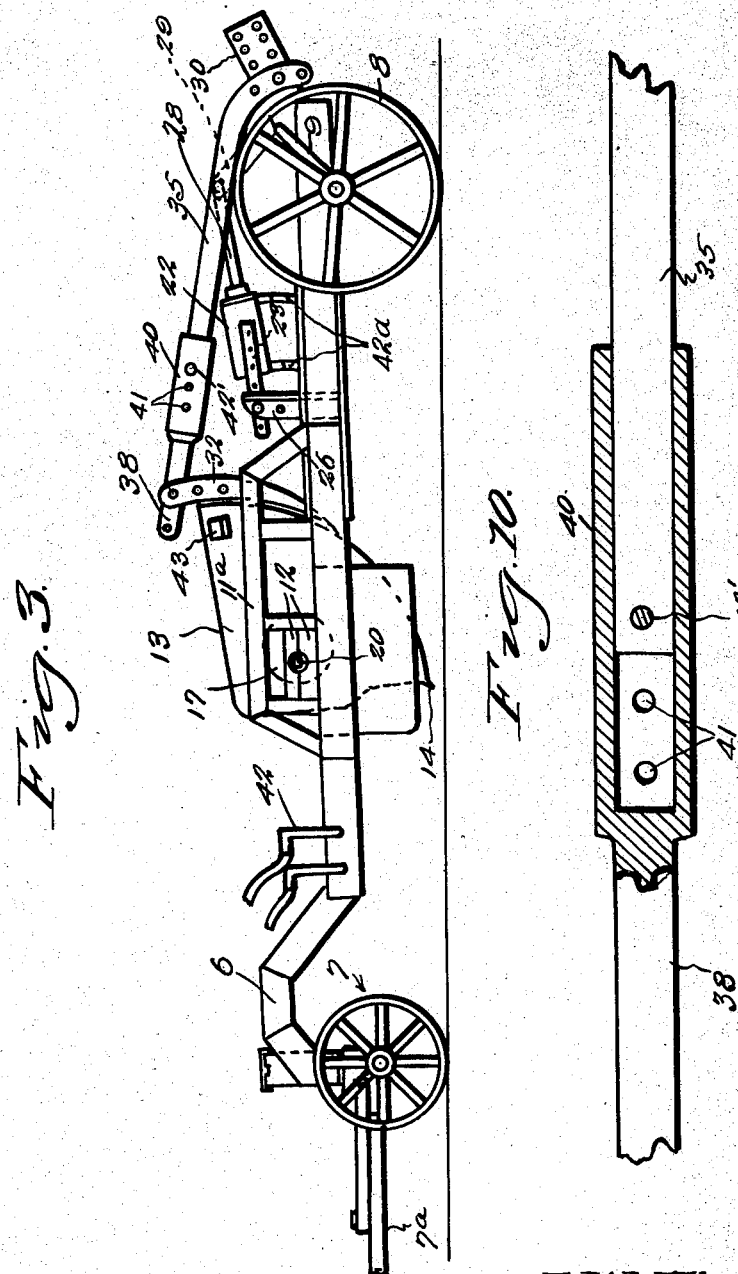

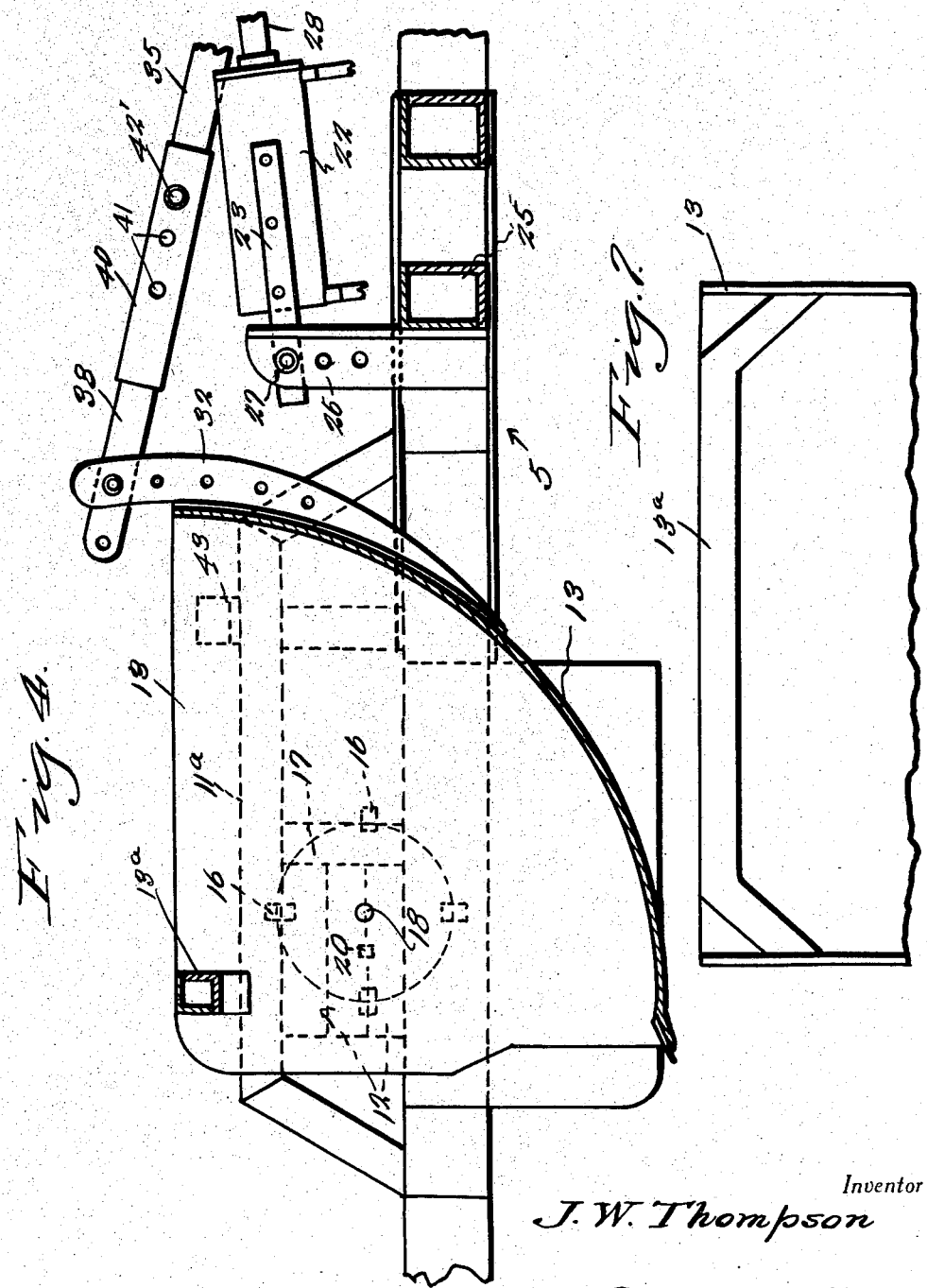

Patented May 9, 1939

2,157,805

UNITED STATES PATENT OFFICE 2,157,805

SCRAPER

Jay Wiley Thompson, Visalia, Calif., assignor to Thompson Manufacturing Company, Visalia, Calif., a limited copartnership of California Application August 7, 1937, Serial No. 157,986

3 Claims. (Cl. 37—126)

This invention relates to machines of the type known as scrapers, and which are generally used for levelling or smoothing down road beds and the like.

Among the objects of the invention is the provision of a scraper machine of the character mentioned having improved means for mounting the bowl of the scraper and for operating the bowl to dump the dirt contents therefrom; and the invention together with its objects and advantages will be best understood from a study of the following description taken in connection with the accompanying drawings wherein:

Figure 1 is a top plan view of the scraper.

Figure 2 is a side elevational view thereof.

Figure 3 is a view similar to Figure 2 but showing the bowl of the scraper in a dumping position.

Figure 4 is a sectional view taken substantially on the line 4—4 of Figure 1.

Figure 5 is a fragmentary detail side elevational view of the bowl showing the eccentric mounting therefor.

Figure 6 is a plan view of a disk and eccentric shaft associated therewith.

Figure 7 is a fragmentary front elevational view of the bowl.

Figure 8 is a detail sectional view taken substantially on the line 8—8 of Figure 2.

Figure 9 is a top plan view of the rear axle assembly, and

Figure 10 is a fragmentary longitudinal sectional view taken substantially on the line 10—10 of Figure 1.

Referring to the drawings by reference numerals it will be seen that in the preferred embodiment thereof the scraper machine comprises a frame 5, the members of which are hollow and rectangular in cross section as shown in Figure 8, being preferably formed of angle bars welded together at the joints as clearly shown in said figure.

At the forward end thereof the frame 5 includes an integral arch 6 to which is connected through the medium of a king pin or in any suitable manner a front steering wheel assembly 7 including a draft tongue 7a through the medium of which the machine may be hitched to a tractor or other draft vehicle.

The rear end of the frame 5 is supported by traction wheels 8 supported on the ends of an arch axle 9. Axle 9 is journaled in suitable bearings 10 provided therefor on the rear of the frame 5.

Intermediate the ends thereof the frame 5 has mounted on the sides of the frame, frame structure 11 which serve as boxings for bearings 12.

The scraper also includes a bowl 13 provided at its leading edge with a removable blade 14.

Mounted on each side 15 of the bowl 13 are a plurality of clamping lugs or clips 16 arranged in circular form and accommodating an adjusting disk 17 pivoted to the adjacent side 15 of the bowl as at 18.

The disk 17 is provided with an eccentrically disposed stub shaft 19 that is journaled in a bearing 12 as shown. At the free end thereof the shaft 19 is squared as at 20 whereby a crank handle or any suitable tool may be associated therewith for turning the disk 17. Thus when it is desired to adjust the bowl relatively to the ground the clips or lugs 16 are loosened and then a wrench or the like is engaged with the non-circular end 20 of stub shaft 19 and the shaft turned to turn the disk 17 which of course raises or lowers the bowl, accordingly in which direction the stub shaft is turned. Then after the proper adjustment is secured, the lugs or clips 16 are tightened to hold the disk 17 in adjusted position.

For swinging the bowl 13 in a counter-clockwise direction to dump the contents of the bowl therefrom there is provided an hydraulic jack 21. The hydraulic jack 21 includes a cylinder 22. Suitably secured to opposite sides of the cylinder 22 are supporting straps 23.

Rising from a cross member 25 of the frame are pairs of angle iron standards 26. Standards 26 are provided with vertically spaced apertures and the free ends of the straps 23 are provided with a plurality of apertures a selected one of which is adapted to aline with a pair of apertures in the posts 26 to accommodate a bolt 27, whereby to provide an adjustable pivotal connection between the straps 23 and the posts 26.

Further the jack 21 includes a piston mounted for reciprocation within the cylinder and a rod 28 for the piston. At the free end thereof the piston rod 28 is pivotally connected to an arm 29 provided intermediate the ends of the axle 9. It will thus be seen that reciprocatory movement of the jack piston will result in a swinging of the axle 9.

Axle 9 has projecting rearwardly therefrom arms 30 in the form of plates provided with upper and lower rows of apertures 31.

Secured to the rear of the bowl 13 are longitudinally curved members 32 which are also provided with apertures 33.

Arms 30 are connected with the members 32 through the medium of longitudinally extensible links 34.

Each link 34 includes a section 35 having an apertured curved end 36 through the medium of which, together with the apertures 31 and pin 37 each link section 35 is adjustably connected with an arm 30.

Each link 34 includes a section 38 that is provided with a plurality of apertures adapted to be selectively alined with a selected aperture in a member 32, whereby, through the medium of a pin 39, link section 38 is adjustably and pivotally connected with a member 32.

The link sections 35 and 38 are adjustably connected together through the medium of a socket 40 provided on one end of link section 38 and provided at opposite sides thereof with apertures 41 adapted to register with apertures on one end of the link section 35, to receive a connecting pin 42' for securing the link sections 35, 38 at the desired position of longitudinal adjustment relative to one another. (See Figure 10.) Lugs or projections 43 are connected with the sides of the bowl adjacent the rear thereof and these lugs rest on the upper rails 11a of frame 11 when the bowl or scoop is in digging position.

Thus it will be seen that to swing the bowl 13 from the position shown in Figure 2, which is a scraping position, in a counter-clockwise direction into the position shown in Figure 3 which is a dumping position, fluid is passed into the jack cylinder 22 at the right hand end of the cylinder causing the piston of the jack to move in a direction to swing the axle 9 in a counter-clockwise direction. The first part of this swinging movement of axle 9 raises the frame 5 and as the projections 43 at the sides of the bowl are resting upon the frame 11a, this raising of the frame raises the scoop out of the ground. Then continued movement of the axle 9 is transmitted through the medium of the arms 31, links 34 and curved members 32 to the bowl 13 for swinging the latter in a counterclockwise to the position shown in Figure 3 whereby to cause the contents of the bowl to discharge therefrom. Thus it will be seen that the bowl is lifted out of the ground by the lifting of the frame during the first part of the turning movement of the axle 9 and then as the axle continues to rotate the arms 30 connected with the axle will move the links 34 forwardly which will move the bowl to dumping position. Of course, during this movement of the bowl relative to the frame the eccentric stub shafts 19 turn in the bearings 12.

Fluid under pressure and from any suitable source of supply is supplied to the cylinder of the jack 21 through the medium of conduits 42 that extend through one of the tubular side members of the frame 5 and at one end are connected through the medium of conduits 42a with the respective opposite ends of the jack cylinder.

From the above it will be seen that I have provided a road scraper whereby the bowl thereof is so mounted as to permit the same to be adjusted vertically to control the digging depth thereof, and whereby also to permit the bowl to be easily and conveniently rotated for dumping the contents thereof.

It is thought that a clear understanding of the construction, utility and advantages of an invention of this character will be had without a more detailed description.

Having thus described the invention what is claimed as new is:—

1. In a scraping machine of the character described, a wheel-supported frame, a scraper bowl extending transversely of the frame intermediate the ends of the latter, and means for mounting the bowl on the frame for vertical adjustment to control the digging depths thereof, and for vertical swinging movement to dump the bowl, said means including bearings on opposite sides of said frame, stub shafts journaled in said bearings, disks on the inner ends of said stub shafts, said stub shafts being eccentrically disposed with respect to said disks, and a circular series of clips on each side of said bowl and engaging the peripheries of said disks.

2. In a scraping machine of the class described, a wheel supported frame, a rear arched axle journalled in the rear part of the frame and carrying some of the wheels, a transverse scoop, stub shafts carried by the ends of the scoop at forward portions thereof, bearings in side parts of the frame for the stub shafts, projections on the ends of the scoop at the rear thereof and engaging portions of the frame for limiting downward movement of the rear portion of the scoop, an arm extendin rearwardly from the arch of the rear axle, a link having its rear end pivoted to the arm and its front end pivotally connected with an upper portion of the rear part of the scoop and means for swinging the rear axle for raising and lowering the frame and for swinging the scoop, said link and arm acting to move the scoop to dumping position after the scoop has been raised out of the ground by upward movement of the frame.

3. In a scraping machine of the class described, a wheel supported frame, a rear arched axle journalled in the rear part of the frame and carrying some of the wheels, a transverse scoop, stub shafts carried by the ends of the scoop at forward portions thereof, bearings in side parts of the frame for the stub shafts, projections on the ends of the scoop at the rear thereof and engaging portions of the frame for limiting downward movement of the rear portion of the scoop, an arm extending rearwardly from the arch of the rear axle, a link having its rear end pivoted to the arm and its front end pivotally connected with an upper portion of the rear part of the scoop, means for swinging the rear axle for raising and lowering the frame and for swinging the scoop, said link and arm acting to move the scoop to dumping position after the scoop has been raised out of the ground by upward movement of the frame, means for adjusting the pivotal point of the link with the arm, and means for adjusting the length of link.

JAY WILEY THOMPSON.